United States Patent [19]

Rosback

[11] 3,882,184

[45] May 6, 1975

[54] PROCESS FOR THE SEPARATION OF ACYCLIC AND MONOCYCLIC MONOTERPENES

[75] Inventor: Donald H. Rosback, Elmhurst, Ill.

[73] Assignee: Universal Oil Products Company, Des Plaines, Ill.

[22] Filed: May 2, 1974

[21] Appl. No.: 466,368

[52] U.S. Cl............ 260/675.5; 208/310; 252/455 Z; 260/674 SA
[51] Int. Cl. ... C01b 33/28; C07c 7/12; C07c 13/00; C09f 3/02
[58] Field of Search.................. 260/675.5, 674 SA; 208/310

[56] References Cited
UNITED STATES PATENTS

| | | | |
|---|---|---|---|
| 2,985,589 | 5/1957 | Broughton et al. | 210/34 |
| 3,510,423 | 5/1970 | Neuzil et al. | 208/310 |
| 3,686,343 | 8/1972 | Bearden et al. | 260/674 |
| 3,696,107 | 10/1972 | Neuzil | 260/674 |
| 3,699,182 | 10/1972 | Cattanach | 260/674 |
| 3,780,125 | 12/1973 | Takacs | 260/675.5 |
| 3,845,151 | 10/1974 | Prieznitz | 260/675.5 |

*Primary Examiner*—Delbert E. Gantz
*Assistant Examiner*—G. E. Schmitkons
*Attorney, Agent, or Firm*—James R. Hoatson, Jr.; Thomas K. McBride; William H. Page, II

[57] ABSTRACT

A process for the separation of an acyclic monoterpene from a feed mixture comprising an acyclic monoterpene and a monocyclic monoterpene which process employs a particular crystalline aluminosilicate adsorbent containing one or more selected cations at the exchangeable cationic sites to selectively adsorb the acyclic monoterpene isomer from the feed mixture. The feed mixture contacts the adsorbent which allows the acyclic monoterpene from the feed mixture to be selectively adsorbed and the acyclic isomer is thereafter recovered from the adsorbent in a more concentrated form as compared to its concentration in the feed mixture. The process can be performed in either the liquid or vapor phase.

A specific embodiment of the process disclosed herein is a process for separating myrcene from a feed mixture comprising myrcene and limonene which process comprises the steps of: contacting the feed mixture at adsorption conditions with a crystalline aluminosilicate adsorbent selected from the group consisting of type X and type Y zeolites containing a selected cation or cations at the exchangeable sites within the zeolite thereby selectively adsorbing myrcene; withdrawing from the adsorbent a stream comprising less selectively adsorbed limonene; contacting the adsorbent at desorption conditions with a desorbent material to effect the removal of myrcene from the adsorbent; and, withdrawing from the adsorbent a stream comprising desorbent material and myrcene.

29 Claims, No Drawings

PROCESS FOR THE SEPARATION OF ACYCLIC AND MONOCYCLIC MONOTERPENES

BACKGROUND OF THE INVENTION

1. Field of the Invention

The field of art to which the claimed invention pertains is solid-bed adsorptive separation. More specifically, the claimed invention relates to a process for the separation of acyclic and monocyclic monoterpenes isomers using a solid adsorbent which selectively removes one of the isomers from a feed mixture.

2. Description of the Prior Art

It is well known in the separation art that certain crystalline aluminosilicates can be used to separate hydrocarbons species from mixtures thereof. In particular, the separation of normal paraffins from branched chained paraffins can be accomplished by using the type A zeolites which have pore openings from 3 to about 5 A. Such a separation process is disclosed for example in U.S. Pat. Nos. 2,985,589 and 3,201,491. These adsorbents allow a separation based on the physical size differences in the molecules by allowing the smaller or normal hydrocarbons to be passed into the cavities within the crystalline aluminosilicate adsorbent, while excluding the larger or branched chain molecules.

U.S. Pat. Nos. 3,265,750 and 3,510,423 for example disclose processes in which larger pore diameter zeolites such as the type X or type Y structured zeolites can be used to separate olefinic hydrocarbons.

In addition to separating hydrocarbon types, the type X or type Y zeolite have also been employed in processes to separate individual hydrocarbon isomers. In the process described in U.S. Pat. Nos. 3,558,730; 3,558,732; 3,626,020 and 3,686,342 for example, they are used to separate desired xylene isomers; in U.S. Pat. No. 3,668,267 they are used to separate particular alkyl substituted naphthalenes.

The present invention relates to a process for the separation of an acyclic monoterpene from a monocyclic monoterpene with a particular crystalline aluminosilicate adsorbent.

We have found that a crystalline aluminosilicate zeolite selected from the group consisting of a type X structured and a type Y structured zeolite containing one or more selected cations exhibits selectivity for the acyclic monoterpene isomer with respect to the monocyclic monoterpene thereby making separation by solid-bed selective adsorption possible. The prior art has neither disclosed nor suggested a process by which an acyclic monoterpene can be separated from a monocyclic monoterpene with a particular zeolitic adsorbent.

SUMMARY OF THE INVENTION

It is accordingly, a broad objective of my invention to provide a process for the separation of an acyclic monoterpene from a feed mixture containing an acyclic monoterpene and a monocyclic monoterpene.

In brief summary, my invention is, in one embodiment, a process for separating an acyclic monoterpene from a feed mixture comprising an acyclic monoterpene and a monocyclic monoterpene which process comprises contacting the mixture with a crystalline aluminosilicate selected from the group consisting of type X structured and type Y structured zeolites containing one or more selected cations at exchangeable cationic sites of said zeolite thereby selectively adsorbing at adsorption conditions said acyclic monoterpene from said mixture and thereafter recovering the selectively adsorbed acyclic monoterpene.

Other embodiments and objects of the present invention encompass details about feed mixtures, adsorbents, desorbents, and operating conditions all of which are hereinafter disclosed in the following discussion of each of these facets of the present invention.

The process of this invention provides a superior alternative to distillation and gas chromatography separation techniques for the separation of feed mixtures comprising an acyclic monoterpene and a monocyclic monoterpene into relatively high purity acyclic monoterpene and monocyclic monoterpene product streams.

Many of the terpenes, principally the monoterpenes, are important articles of commerce and are used directly or are the raw materials for the preparation of perfumes, flavors, protective coatings, pharmaceuticals, insecticides, bactericides, flotation agents, condensation catalysts, extreme-pressure lubricant additives, adhesives, solvents and plasticizers.

DESCRIPTION OF THE INVENTION

Adsorbents which can be used in the process of this invention are generally referred to as crystalline aluminosilicates or molecular sieves and can comprise both the natural and synthetic aluminosilicates. Particular crystalline aluminosilicates encompassed by the present invention include aluminosilicate cage structures in which the alumina and silica tetrahedra are intimately connected in an open three dimensional network. The tetrahedra are cross-linked by the sharing of oxygen atoms with spaces between the tetrahedra occupied by water molecules prior to partial or total dehydration of this zeolite. The dehydration of the zeolite results in crystals interlaced with cells having molecular dimensions. Thus, the crystalline aluminosilicates are often referred to as molecular sieves when the separation which they effect is dependent essentially upon distinction between molecule sizes.

In the process of this invention, however, the term molecular sieves is not strictly suitable since the separation of isomers is dependent on electrochemical attraction of different isomer configurations rather than pure physical size differences in the isomer molecules.

In hydrated form, the crystalline aluminosilicates generally encompass those zeolites represented by the formula 1 below:

Formula 1

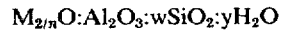

$$M_{2/n}O:Al_2O_3:wSiO_2:yH_2O$$

where "M" is a cation which balances the electrovalence of the tetrahedra and is generally referred to as an exchangeable cationic site, $n$ represents the valence of the cation, $w$ represents the moles of $SiO_2$ and $y$ represents the moles of water. The cations may be any one of a number of cations which will be hereinafter described in detail.

The type X structured and type Y structured zeolites as used in this specification shall include crystalline aluminosilicates having a three dimensional interconnected cage structure and can specifically be defined by U.S. Pat. Nos. 2,882,244 and 3,130,007. The terms "type X structured" and "type Y structured" zeolites as used herein shall include all zeolites which have a general structure as represented in the above two cited patents and additionally shall specifically include those crystalline aluminosilicates produced from either of the zeolites described in U.S. Pat. Nos. 2,882,244 and 3,130,007, as starting materials by various ion exchange techniques or thermal treatments or combinations thereof to in any way modify the properties (such as pore diameter or cell size) of the type X or type Y zeolite starting material. As an example, the modified type Y zeolite produced by the thermal treatment of an ammoniumexchanged type Y zeolite in the presence of water vapor, as described in U.S. Pat. No. 3,506,400, shall be included within the term "type Y structured zeolite" as shall any zeolite produced by subsequent ion-exchange of the modified type Y zeolite so produced. In the most limiting sense only these terms refer to type X and type Y zeolites.

The type X structured zeolites can be represented in terms of mole oxides as represented in formula 2 below:

Formula 2

$$(0.9 \pm 0.2)M_{2/n}O:Al_2O_3:(2.5 \pm 0.5)SiO_2:yH_2O$$

where "M" represents at least one cation having a valence of not more than 3, $n$ represents the valence of "M" and $y$ is a value up to about 9 depending upon the identity of "M" and the degree of hydration of the crystalline structure.

The type Y structured zeolites can be represented in terms of the mole oxides for the sodium form as represented by formula 3 below:

Formula 3

$$(0.9 \pm 0.2)Na_2O:Al_2O_3:wSiO_2:yH_2O$$

where $w$ is a value of greater than about 3 up to 8, and $y$ may be any value up to about 9.

Adsorbents contemplated herein include not only the sodium form of the type Y zeolite but also crystalline materials obtained from such a zeolite by partial or complete replacement of the sodium cation with other individual cations or group of cations. Similarly, the type X zeolite also may be ion-exchanged.

Cationic or base exchange methods are generally known to those familiar with the filed of crystalline aluminosilicate production. They are generally performed by contacting the zeolite with an aqueous solution of the soluble salt of the cation or cations desired to be placed upon the zeolite. The desired degree of exchange takes place before the sieves are removed from the aqueous solution, washed and dried to a desired water content. It is contemplated that cation exchange operations may take place using individual solutions of desired cations placed on the zeolite or using an exchange solution containing a mixture of cations, where two or more desired cations are placed on the zeolite.

The cations which may be placed upon a type X or type Y structured zeolite to produce a suitable adsorbent include cations selected from, but not limited to, the Group I-A, Group II-A, and Group I-B metals. Specific cations which show a preferential selectivity for an acyclic monoterpene with respect to a monocyclic monoterpene include lithium, sodium, potassium, rubidium, cesium, beryllium, magnesium, calcium, strontium, and barium. Where the above cations are used, the acyclic monoterpene would be the preferentially adsorbed component of the feed mixture. In the process of this invention I have found that a crystalline aluminosilicate selected from the group consisting of type X structured and type Y structured zeolites containing at the exchangeable cationic sites at least one cation selected from the group consisting of lithium, sodium, potassium, rubidium, cesium and barium are particularly preferred.

Selected cation combinations have also been shown to be suited for the separation of acyclic and monocyclic monoterpene isomers. The cation combinations selected from the group consisting of potassium and barium, potassium and beryllium, potassium and magnesium, rubidium and barium, cesium and barium, copper and cadmium, copper and silver, zinc and silver, copper and potassium have been shown suitable for the separation of acyclic and monocyclic monoterpenes. Of these barium and potassium combination is particularly preferred.

When singular cations are based exchanged upon a zeolite the singular cations can comprise anywhere from 5 up to 75 wt. percent on a relative volatile free basis of the zeolite depending upon the molecular weight of the material exchanged upon the zeolite. It is contemplated that when single ions are placed upon the zeolite that they may be on the zeolite in concentrations of from about 1 percent to about 100 percent of the original cations present (generally sodium) upon the zeolite prior to its being ion-exchanged. By knowing the empirical formula including the silica to alumina ratio of the zeolite used, its water content, and the percentage of binder used, if any, it is possible to calculate the percentage of ion-exchange that has taken place.

When two or more cations are placed upon the zeolite there are two parameters in which one can operate in order to effectively produce a zeolite having the maximum selective properties. One of the parameters is the extent of the zeolite ion exchange which is determined by the length of time, temperature and cation concentration. The other parameter is the ratio of individual cations placed on the zeolite. In instances in which the cation pairs comprise a Group I-A metal and a Group II-A metal, the weight ratio of these two respective components upon the zeolite can vary anywhere from about less than one up to about one hundred depending upon the molecular weight of the Group I-A or Group II-A metal.

Because of the highly reactive nature of the monoterpenes, especially the acyclic monoterpenes, it is very important that the adsorbent possess little or no catalytic activity toward polymerization or isomerization which would either degrade the produce quality, reduce the overall yield of desired product or possibly degrade adsorbent performance. I have found that the polymerization effects of the adsorbent are of primary concern. Unless the adsorbent possesses little or no polymerization activity, myrcene for example will be rapidly polymerized. It is thought that such activity is due primarily to the presence of hydrogen cations within the zeolite or the binder used to produce the adsorbent particles. I have discovered that ion-exchanging the type X or type Y zeolitic adsorbent with a dilute aqueous solution of sodium or potassium hydroxide eliminates such acid sites and produces an adsorbent with little or no catalytic activity. This ion-exchange step may then be followed by further ion-exchanges as desired. During any subsequent ion-exchange steps and washes, it is important that the pH of the exchange medium is maintained at or above 7 to avoid recreating acid sites.

In the process of this invention I have additionally found that a small amount of water on the adsorbent is beneficial to improve desorption rates thereby promoting reasonably sharp isomer separation and preventing "tailing." The preferred range of water on the adsorbent is from about 0.5 to about 5 wt. percent on a volatile-free basis. This desired range can be maintained by intermittent or preferably continuous water addition to the process.

In this specification, the volatile matter content (generally water) of the zeolitic adsorbent is determined by first weighing the adsorbent and thereafter contacting the adsorbent in a high temperature furnace at 900°C. under an inert purge gas stream such as nitrogen for a period of time sufficient to achieve a constant weight. The sample is then cooled under an inert atmosphere and weighed to determine the difference in weight between the adsorbent before it was passed into the oven and afterwards. The difference in weight is calculated as a loss on ignition (LOI) and represents the volatile matter present within the adsorbent. A specific example would be a 100 gram sample of the zeolitic adsorbent placed into a muffle furnace at about 900°C. for a period of 5 to 6 hours with a dry nitrogen purge gas passing over the zeolite. The zeolite is then removed from the furnace, cooled under an inert atmosphere, and reweighed yielding a total weight of about 95 grams. On this basis, the original adsorbent can be said to have contained 5 wt. percent volatile matter. The chemical analyses performed on the zeolites are based on volatile-free matter and are determined by taking into account the amount of material which is lost by determination of volatile matter and correcting the individual chemical analysis in weight percent to take this factor into consideration.

The terpenes strictly speaking are acyclic and cyclic hydrocarbons whose molecular formulas are some multiple of $C_5H_8$. Most of the hydrocarbons are unsaturated and they can be considered condensation products of isoprene, $C_5H_8$. The terpenes (and their derivatives) can therefore be classified according to the number of isoprene units — one, two, three, four or more — into hemiterpene (isoprene), $C_5H_8$; monoterpenes, $C_{10}H_{16}$; sesquiterpenes, $C_{15}H_{24}$; diterpenes, $C_{20}H_{32}$; and polyterpenes, $(C_5H_8)_n$ of which the most numerous are the $C_{30}$ triterpenoids.

These classes of terpenes may be further subdivided into acyclic, monocyclic, bicyclic, etc. The degree of unsaturation depends upon the number of carbon atoms (number of isoprene units) and the number of rings, one double bond disappearing for each carbon-to-carbon bond formed. Thus in the monoterpenes the number of ethylenic linkage varies from one in the tricyclic hydrocarbons to three in the acyclic.

It is apparently this difference in the degree of unsaturation between acyclic and monocyclic monoterpenes which makes possible their separation by certain crystalline aluminosilicate adsorbents.

Although in the past the major use of terpenes has been for solvents, they are becoming increasingly important for chemical synthesis and they would become even more so if they could be obtained in relatively higher purities. Indeed, physical constant of many important terpenes, some of the acyclic and monocyclic monoterpenes and their derivatives for instance, are subjected to revision inasmuch as many of the compounds have not been prepared in the pure condition.

Acyclic monoterpenes of particular interest are myrcene, ocimene and allo-ocimene. Myrcene may be prepared by the vapor-phase thermal isomerization of beta pinene or of turpentine fractions rich in beta pinnene. As taught in U.S. Pat. No. 2,507,546, yields of about 85 percent have been reported from this method. A technical grade of about 75–80 percent myrcene is available. Ocimene, which has not been prepared in the pure state, may be prepared under special conditions by the vapor-phase thermal isomerization of alpha-pinene or of turpentine fractions rich in alpha-pinene. Likewise, allo-ocimene may be prepared by thermal isomerization of alpha-pinene or of ocimene. Allo-ocimene is available commercially as a by-product of dipentene synthesis by thermocracking alpha-pinene.

The most important monocyclic terpene industrially is limonene and its optically inactive form dipentene. The principal commercial sources are the oils of orange, grapefruit and lemon. Dipentene occurs in a variety of essential oils such as bergamot, citronella and nutmeg. They can also be formed together with acyclic terpenes by thermal cracking of alpha-pinene or of turpentine fractions containing alpha-pinene or as a major by-product in many acid-catalyzed reactions of alpha-pinene.

Since many of the acyclic and monocyclic monoterpenes can be prepared from the bicyclic monoterpenes alpha- and beta-pinene as previously described, it is contemplated that feed mixtures to the process of this invention may comprise products prepared by the thermal cracking or isomerization of alpha-pinene, beta-pinene or a mixture, such as turpentine fractions, comprising both alpha- and beta-pinene. Feed mixtures to my process may contain as diluents components other than the acyclic and monocyclic monoterpene isomers which components are generally less selectively adsorbed (if at all) in this adsorption system and in which the monoterpenes are soluble.

In one embodiment of the process of my invention myrcene, obtained by thermal cracking of beta-pinene, is separated from the by-product limonene. With boiling points of 167° C. and 176° C. respectively for myrcene and limonene the compounds could of course be separated by distillation. The process of my invention however offers a competitive more efficient alternative method of separating the isomers into relatively high purity fractions of myrcene and limonene.

To separate an acyclic monoterpene from a feed mixture comprising an acyclic monoterpene and a monocyclic monoterpene, the mixture is contacted with the adsorbent while the less selectively adsorbed monocyclic monoterpene is removed from the interstitial void spaces between the particles of adsorbent and the surface of the adsorbent. The adsorbent containing the more selectively adsorbed acyclic isomer is referred to as a "rich" adsorbent — rich in the more selectively adsorbed acyclic isomer.

The more selectively adsorbed isomer is commonly referred to as the extract component of the feed mixture, while the less selectively adsorbed component is referred to as the raffinate component. Fluid streams leaving the adsorbent comprising an extract component and comprising a raffinate component are referred to, respectively, as the extract stream and the raffinate stream. The feed mixture can contain more than one acyclic monoterpene or more than one monocyclic monoterpene isomer and it will therefore be recognized that all of the acyclic isomers will be selectively adsorbed with respect to monocyclic isomers. Thus the extract stream will contain as extract components the acyclic monoterpene isomers appearing in the feed mixture and the raffinate stream will contain as raffinate components the monocyclic monoterpenes appearing in the feed mixture.

Although it is possible by the process of this invention to produce realtively high purity acyclic and monocyclic monoterpene product streams at relatively high recoveries, it will be appreciated that an extract component is never completely adsorbed by the adsorbent, nor is a raffinate component completely non-adsorbed by the adsorbent. Therefore, small amounts of a raffinate component can appear in the extract stream, and likewise, small amounts of an extract component can appear in the raffinate stream. The extract and raffinate streams then are further distinguished from each other and from the feed mixture by the ratio of the acyclic isomer to the monocyclic isomers appearing in the particular streams. More specifically, the ratio of the more selectively adsorbed acyclic isomer to the less selectively adsorbed monocyclic isomer will be highest in the extract stream, next highest in the feed mixture and lowest in the raffinate stream. Likewise, the ratio of the less selectively adsorbed monocyclic isomer to the more selectively adsorbed acyclic isomer will be highest in the raffinate stream, next highest in the feed mixture and lowest in the extract stream.

The adsorbent can be contained in one or more chambers where through programmed flow into and out of the chambers separation of the isomers is effected. The adsorbent may be contacted with a desorbent material which is capable of displacing the adsorbed acyclic isomer from the adsorbent. Alternatively, the adsorbed acyclic isomer could be removed from the adsorbent by purging or by increasing the temperature of the adsorbent or by decreasing the pressure of the chamber or vessel containing the adsorbent or by a combination of these means.

The adsorbent may be employed in the form of a dense compact fixed-bed which is alternately contacted with the feed mixture and a desorbent material (hereinafter described). In the simplest embodiment of the invention the adsorbent is employed in the form of a single static bed in which case the process is only batch or semicontinuous. A set of two or more static beds may be employed in fixed-bed contacting with appropriate valving so that the feed mixture is passed through one or more adsorbent beds while the desorbent material is passed through one or more of the other beds in the set. The flow of feed mixture and desorbent material may be either up or down through the adsorbent. Any of the conventional apparatus employed in static bed fluid-solid contacting may be used.

Moving bed or simulated moving bed systems, however, have a much greater separation efficiency than fixed adsorbent bed systems and are therefore preferred.

Specifically, the more preferred processing flow schemes which can be utilized to effect the process of this invention are those known in the art as simulated moving-bed countercurrent systems. One such system includes the flow scheme described in U.S. Pat. No. 2,985,589 issued to D. B. Broughton. This patent generally describes the processing sequence involved in a particular simulated moving-bed countercurrent solid-fluid contacting process. In fact, the processing sequence generally described in that patent is the preferred mode of operating the separation process disclosed herein.

With that processing sequence therefore, one embodiment of my invention is a process for separating an acyclic monoterpene from a feed mixture comprising an acyclic monoterpene and a monocyclic monoterpene which process comprises the steps of: contacting said mixture at adsorption conditions with a particular zeolitic adsorbent to effect the selective adsorption of said acyclic monoterpene; withdrawing from the adsorbent bed a stream comprising the adsorbent at desorption conditions with a desorbent material to effect the removal of the said acyclic monoterpene from the adsorbent; and, withdrawing from the adsorbent a stream comprising desorbent material and said acyclic monoterpene.

Preferred operating conditions for both adsorption and desorption of this particular embodiment of my invention include a temperature within the range of from about 70° F. to about 450° F. and a pressure within the range of from about atmospheric to about 500 psig. Furthermore, both adsorption and desorption are preferably affected at conditions selected to maintain liquid phase throughout the bed of adsorbent.

Adsorption and desorption could, of course, be conducted both in the vapor phase or liquid phase or one operation may be conducted in the vapor phase and the other in the liquid phase. Operating pressures and temperatures for adsorption and desorption might be the same or different.

The desorbent materials which can be used in the various processing schemes employing this adsorbent will ary depending on the type of operation employed. The term "desorbent material" as used herein means any fluid substance capable of removing a selectively adsorbed isomer from the adsorbent. In the swing-bed system in which the selectively adsorbed isomer is removed from the adsorbent by a purge stream, gaseous hydrocarbons such as methane, ethane, etc. or other types of gases such as nitrogen or hydrogen may be used at elevated temperatures or reduced pressures or both to effectively purge the adsorbed isomer from the adsorbent.

However, in processes which are generally operated at substantially constant pressures and temperatures to insure liquid phase the desorbent material relied upon must be judiciously selected in order that it may displace the adsorbed isomer from the adsorbent with reasonable mass flow rates and also without unduly preventing the adsorbed isomer from displacing the desorbent in a following adsorption cycle.

Desorbent materials which can be used in the process of this invention should additionally be substances which are easily separable from the feed mixture that is passed into the process. In desorbing the preferentially adsorbed component of the feed both desorbent and the extract component are removed from the adsorbent in admixture. Without a method of separation of these two materials, the purity of the extract component of the feed mixture would not be very high since it would be diluted with desorbent. It is contemplated that any desorbent material used in this process will have a substantially different average boiling point than that of the feed mixture. More specifically, "substantially different" shall mean that the difference between the average boiling point shall be at least 20° F. The boiling range of the desorbent material could be higher or lower than that of the feed mixture. The use of a desorbent material having a substantially different average boiling point than that of the feed allows separation of desorbent material from feed components in the extract and raffinate streams by simple fractionation or other methods thereby permitting reuse of the desorbent material in the process.

Desorbent materials which can be used in the process of this invention include paraffins, olefins, aromatics, ethers, alcohols, cyclic dienes and ketones.

In the preferred isothermal, isobaric, liquid-phase operation of the process of my invention, I have found that olefin-containing desorbent materials are particularly effective. Specifically, desorbent materials containing linear olefins are especially preferred for this type of operation. Linear olefins having from 4 to 8 carbon atoms per molecule are particularly preferred. Mixtures of olefins with non-olefins such as paraffins have additionally been found to be particularly effective.

With the type of processes employing adsorbents to separate acyclic and monocyclic monoterpenes isomers by selective adsorption now in mind, one can appreciate that certain characteristics of adsorbents are highly desirable, if not absolutely necessary to the successful operation of a selective adsorption process. Among such characteristics are: adsorptive capacity for some volume of an extract component per volume of adsorbent; the selective adsorption of an extract component with respect to a raffinate component and the desorbent; sufficiently fast rates of adsorption and desorption of the extract component to and from the adsorbent; and, little or no catalystic activity for undesired reactions such as polymerization and isomerization.

Capacity of the adsorbent for adsorbing a specific volume of an extract component, is, of course, a necessity; without such capacity the adsorbent is useless for adsorptive separation. Furthermore, the higher the adsorbent's capacity for an extract component, the better is the adsorbent. Increased capacity of a particular adsorbent makes it possible to reduce the amount of adsorbent needed to separate the extract component contained in a particular charge rate of feed mixture. A reduction in the amount of adsorbent required for a specific adsorptive separation reduces the cost of the separation process. It is important that the good initial capacity of the adsorbent be maintained during actual use in the separation process over some economically desirable life.

The second necessary adsorbent characteristic is the ability of the adsorbent to separate components of the feed; or, in other words that the adsorbent possess adsorptive selectivity, (B), for one component as compared to another component. Selectivity can be expressed not only for one feed mixture component as compared to another but can also be expressed between any feed mixture component and the desorbent. The selectivity, (B), as used throughout this specification is defined as the ratio of the two components of the adsorbed phase over the ratio of the same two components in the unadsorbed phase at equilibrium conditions.

Selectivity is shown as Equation 1 below:

EQUATION 1

$$\text{Selectivity} = (B) = \frac{[\text{vol. percent C/vol. percent D}]_A}{[\text{vol. percent C/vol. percent D}]_U}$$

where C and D are two components of the feed represented in volume percent and the subscripts A and U represent the adsorbed and unadsorbed phases respectively. The equilibrium conditions as defined here were determined when the feed passing over a bed of adsorbent does not change composition after contacting the bed of adsorbent. In other words, there was no net transfer of material occurring between the unadsorbed and adsorbed phases.

As can be seen where the selectivity of two components approaches 1.0 there is no preferential adsorption of one component by the adsorbent. As the (B) becomes less than or greater than 1.0 there is a preferential selectivity by the adsorbent of one component. When comparing the selectivity of the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Desorbents ideally would have a selectivity equal to about 1 or slightly less than 1.

The third important characteristic is the rate of exchange of the adsorbed isomer with the desorbent or, in other words, the relative rate of desorption of the adsorbed isomer. This characteristic relates directly to the amount of desorbent that must be employed in the process to recover the adsorbed isomer from the adsorbent.

It is also necessary that the adsorbent possess little or no catalytic activity toward polymerization or isomerization of the monoterpene isomers. Such activity might effect adsorbent capacity or selectivity or product yields or all of these. Polymerization tends primarily to degrade the adsorbent in addition to reducing yields somewhat. Polymerization effects are generally considered to be primarily physcial impediments which can prevent the olefinic hydrocarbons from passing into the molecular sieve adsorbent by obstructing the surface of the adsorbent and the pores present in the structure of the adsorbent. This shortens the useful life of the adsorbent and makes necessary frequent regeneration treatments to restore the adsorptive properties of the adsorbent. Isomerization activity tends primarily to decrease the yield of the desired isomer and it is the elimination of this activity which we have found to be of primary concern rather than polymerization activity in the process of my invention. It is, therefore, extremely important that the catalytic activity be substantially reduced or preferably totally eliminated by proper methods of manufacture of a selected adsorbent.

While reducing the temperature of the operations of the adsorption process in which the catalytic activity is present will substantially reduce the catalytic activity because of the associated reduction in the rate of reaction, this procedure in adsorptive separation processes employing molecular sieves is generally not desirable because the reduction in temperature also reduces the rates of adsorption and desorption of the selectively adsorbed isomer.

In order to test various adsorbents to measure the characteristics of adsorptive capacity and selectivity, a dynamic testing apparatus is employed. The apparatus consists of an adsorbent chamber of approximately 70 cc. volume having inlet and outlet portions at opposite ends of the chamber. The chamber is contained within a temperature control means, and, in addition, pressure control equipment is used to operate the chamber at a constant predetermined pressure. Chromatographic analysis equipment can be attached to the outlet line of the chamber and used to analyze the effluent stream leaving the adsorbent chamber.

A pulse test, performed using this apparatus and the following general procedure, is used to determine selectivities and other data for various adsorbent systems. The adsorbent is filled to equilibrium with a particular desorbent material by passing the desorbent material through the adsorbent chamber. At a convenient time, a pulse test of feed containing known concentrations of non-adsorbed paraffinic tracer (n-nonane for instance) and of the particular acyclic and monocyclic monoterpene isomers all diluted in desorbent is injected for a duration of several minutes. Desorbent flow is resumed, and the tracer and the monoterpene isomers are eluted as in a liquid-solid chromatographic operation. The effluent can be analyzed by on-stream chromatographic equipment and traces of the envelopes of corresponding component peaks developed. Alternatively, effluent samples can be collected periodically and later analyzed separately by gas chromatography.

From information derived from the chromatographic traces, adsorbent performance can be rated in terms of capacity index for an extract component, selectivity for one isomer with respect to the other, and the rate of desorption of extract component by the desorbent. The capacity index may be characterized by the distance between the center of the peak envelope of the selectively adsorbed isomer and the peak envelope of the tracer component or some other known reference point. It is expressed in terms of the volume in cubic centimeters of desorbent pumped during this time interval. Selectivity, (B), for the adsorbed isomer with respect to the nonadsorbed isomer is characterized by the ratio of the distance between the center of the adsorbed isomer peak envelope and the tracer peak envelope (or other reference point) to the corresponding distance for the other (non-adsorbed) isomer. The rate of exchange of the adsorbed isomer with the desorbent can generally be characterized by the width of the peak envelopes at half intensity. The narrower the peak width the faster the desorption rate. The desorption rate can also be characterized by the distance between the center of the tracer peak envelope and the disappearance of the selectively adsorbed isomer which has just been desorbed. This distance is again the volume of desorbent pumped during this time interval.

To translate this type of data into a practical separation process requires actual testing of the best system in a continuous countercurrent liquid-solid contacting device. The general operating principles of such a device have been previously described and are found in Broughton U.S. Pat. No. 2,985,589. A specific laboratory-size apparatus utilizing these principles is described in de Rosset et al U.S. Pat. No. 3,706,812. The equipment comprises multiple adsorbent beds with a number of access lines attached to distributors within the beds and terminating at a rotary distributing valve. At a given valve position, feed and desorbent are being introduced through two of the lines and raffinate and extract are being withdrawn through two more. All remaining access lines are inactive and when the position of the distributing valve is advanced by one index all active positions will be advanced by one bed. This simulates a condition in which the adsorbent physically moves in a direction countercurrent to the liquid flow. Additional details on the above-mentioned adsorbent testing apparatus and adsorbent evaluation techniques may be found in the paper "Separation of $C_8$ Aromatics by Adsorption" by A. J. DeRosset, R. W. Neuzil, D. J. Korous and D. H. Rosback presented at the American Chemical Society, Los Angeles, Calif., March 28 through April 2, 1971.

The feasibility of separating an acyclic monoterpene from a feed mixture comprising an acyclic monoterpene and a monocyclic monoterpene by selective adsorption, which was demonstrated by pulse test results, may be confirmed by continuous testing in the laboratory-sized apparatus described above.

EXAMPLE

The following example is presented to further illustrate the basis and benefit of the present invention and is not intended to limit the scope of the invention.

This example presents results of pulse tests which were performed using a particular adsorbent primarily to determine selectivities of the adsorbent for an acyclic monoterpene isomer relative to a monocyclic monoterpene isomer. The selectivity numbers illustrate the adsorbent's ability to separate these two monoterpene isomers.

The adsorbent was a type X structured zeolite which contained a small portion of binder material and was approximately 20–40 mesh particle size.

A sodium form type X structured zeolite had been ion-exchanged first with a dilute aqueous caustic solution for the purpose of eliminating catalytic activity of the final adsorbent. The zeolite was then ion-exchanged with a potassium chloride solution to give a volatile-free potassium oxide content of about 19 wt. percent and the adsorbent was adjusted to a water level of 1.4 wt. percent before it was utilized in the pulse test apparatus. The adsorbent was placed in a 70 cc. adsorbent column which was maintained at either 60° C. or 100° C. with constant pressure of 60 psig. during the entire operation. The column effluent was sampled every 2.5 minutes by an automatic sampling chromatograph.

The feed mixture utilized comprised 50 vol. percent myrcene and 50 vol. percent limonene to which was added a small amount of n-nonane as a "tracer" for reference purposes. The mixture was injected into the test column in pulses of 3.6 cc. each. The desorbent material used comprised a blend of 50 vol. percent hexene-1 and 50 vol. percent iso-pentane.

The effluent was analyzed by the on-stream chromatographic equipment and traces of the envelopes of component peaks were developed.

From information derived from the chromatographic traces, selectivities of the adsorbent for myrcene with respect to limonene and the volume of desorbent necessary to desorb myrcene were obtained in the manner previously described. Results for two tests, A and B, are shown in the Table below.

Table 1

| Test | Temperature °C | Pulse Test Results Selectivity, (B) myrcene limonene | Volume of desorbent to desorb myrcene, cc. |
|---|---|---|---|
| A | 60 | 1.66 | 164 |
| B | 100 | 1.30 | 79 |

The selectivity values shown for the two tests demonstrate first of all the adsorbent's ability to selectively adsorb myrcene with respect to limonene thereby making separation of the isomer possible. The data also indicates the effect of temperature on selectivity and on the rate of desorption of the selectively adsorbed myrcene. At the higher temperature of 100°C. the selectivity decreased from 1.66 at 60° C. to 1.30 but at the higher temperature about half of the desorbent was required to desorb the adsorbed myrcene as was required in test A at 60° C.

I claim as my invention:

1. A process for separating an acyclic monoterpene from a feed mixture comprising an acyclic monoterpene and a monocyclic monoterpene which process comprises contacting said mixture with a crystalline aluminosilicate adsorbent selected from the group consisting of type X structured and type Y structured zeolites containing at least one cation selected from the group consisting of lithium, sodium, potassium, rubidium, cesium and barium at the exchangeable cationic sites within said zeolite thereby selectively adsorbing, at adsorption conditions, said acyclic monoterpene isomer from said mixture and thereafter recovering the selectively adsorbed isomer.

2. The process of claim 1 further characterized in that said acyclic monoterpene comprises myrcene.

3. The process of claim 1 further characterized in that said acyclic monoterpene comprises ocimene.

4. The process of claim 1 further characterized in that said acyclic monoterpene comprises allo-ocimene.

5. The process of claim 1 further characterized in that said monocyclic monoterpene comprises limonene.

6. The process of claim 1 further characterized in that said monocyclic monoterpene comprises dipentene.

7. The process of claim 1 further characterized in that said adsorbent contains at least one cation selected from the group consisting of sodium, potassium, cesium and barium.

8. A process for separating an acyclic monoterpene from a feed mixture comprising an acyclic monoterpene and a monocyclic monoterpene which process comprises the steps of:
  a. contacting said mixture at adsorption conditions with a crystalline aluminosilicate selected from the group consisting of type X and type Y zeolites containing at least one cation selected from the group consisting of lithium, sodium, potassium, rubidium, cesium and barium at the exchangeable cationic sites within said zeolite, thereby selectively adsorbing said acyclic monoterpene;
  b. withdrawing from the adsorbent bed a stream comprising the less selectively adsorbed monocyclic monoterpene
  c. contacting the adsorbent at desorption conditions with a desorbent material to effect the removal of said acyclic monoterpene from the adsorbent; and,
  d. withdrawing from the adsorbent a stream comprising desorbent material and said acyclic monoterpene.

9. The process of claim 8 further characterized in that said acyclic monoterpene comprises myrcene.

10. The process of claim 8 further characterized in that said acyclic monoterpene comprises ocimene.

11. The process of claim 8 further characterized in that said acyclic monoterpene comprises allo-ocimene.

12. The process of claim 8 further characterized in that said monocyclic monoterpene comprises limonene.

13. The process of claim 8 further characterized in that said monocyclic monoterpene comprises dipentene.

14. The process of claim 8 further characterized in that said adsorbent contains at least one cation selected from the group consisting of sodium, potassium, cesium and barium.

15. The process of claim 14 further characterized in that said adsorbent contains potassium cations as the major cation at the cationic exchangeable sites within the adsorbent.

16. The process of claim 14 further characterized in that said adsorbent contains sodium cations as the major cation at the cationic exchangeable sites within the adsorbent.

17. The process of claim 14 further characterized in that said adsorbent contains barium and potassium at the cationic exchangeable sites within the adsorbent.

18. The process of claim 8 further characterized in that said feed mixture is prepared by the thermal cracking of alpha-pinene.

19. The process of claim 8 further characterized in that said feed mixture is prepared by the thermal cracking of beta-pinene.

20. The process of claim 8 further characterized in that said feed mixture is prepared by the thermal cracking of a mixture comprising alpha- and beta-pinene.

21. The process of claim 8 further characterized in that said desorbent material comprises linear olefins having a different boiling point than that of the feed mixture.

22. The process of claim 8 further characterized in that said desorbent material comprises a mixture of linear olefins and paraffins, said mixture having a different boiling point than that of the feed mixture.

23. The process of claim 8 further characterized in that said adsorption and desorption conditions include temperatures within the range of from about 70° F. to about 450° F. and pressures from about atmospheric to about 500 psig.

24. A process for separating myrcene from a feed mixture comprising myrcene and limonene which process comprises the steps of:
  a. contacting said mixture at adsorption conditions with a crystalline aluminosilicate adsorbent selected from the group consisting of a type X structured and a type Y structured zeolite containing at least one cation selected from the group consisting of lithium, sodium, potassium, rubidium, cesium and barium at the exchangeable cationic sites within said zeolite, thereby selectively adsorbing myrcene;

b. withdrawing from the adsorbent bed a stream comprising less selectively adsorbed limonene;

c. contacting the adsorbent at desorption conditions with a desorbent material comprising linear olefins having a different boiling point than that of the feed mixture to effect the removal of myrcene from the adsorbent; and, d. withdrawing from the adsorbent a stream comprising desorbent material and said myrcene.

25. The process of claim 24 further characterized in that said adsorbent comprises type X structured zeolite.

26. The process of claim 24 further characterized in that said adsorbent contains from about 0.5 to about 5 weight percent water on a volatile-free basis.

27. The process of claim 24 further characterized in that said adsorbent contains potassium as the major cation at the cationic exchangeable sites within the adsorbent.

28. The process of claim 24 further characterized in that said linear olefins have from 4 to 8 carbon atoms per molecule.

29. The process of claim 24 further characterized in that said adsorption conditions and said desorption conditions include temperatures within the range of from about 70° F. to about 450° F. and pressures from about atmospheric to about 500 psig.

* * * * *